(12) United States Patent
Prouvost et al.

(10) Patent No.: US 8,964,524 B2
(45) Date of Patent: Feb. 24, 2015

(54) METHOD OF ROUTING AN SIP MESSAGE IN THE EVENT OF UNAVAILABILITY OF INTERMEDIATE NODES

(75) Inventors: Sébastien Prouvost, Toulouse (FR); Youssef Chadli, Houilles (FR)

(73) Assignee: France Telecom, Paris (FR)

( * ) Notice: Subject to any disclaimer, the term of this patent is extended or adjusted under 35 U.S.C. 154(b) by 497 days.

(21) Appl. No.: 12/445,895

(22) PCT Filed: Oct. 15, 2007

(86) PCT No.: PCT/FR2007/052159
§ 371 (c)(1),
(2), (4) Date: Aug. 18, 2009

(87) PCT Pub. No.: WO2008/047037
PCT Pub. Date: Apr. 24, 2008

(65) Prior Publication Data
US 2010/0238928 A1    Sep. 23, 2010

(30) Foreign Application Priority Data
Oct. 16, 2006  (FR) ...................................... 06 54297

(51) Int. Cl.
*G01R 31/08* (2006.01)
*H04L 12/707* (2013.01)
*H04L 29/06* (2006.01)
*H04L 12/751* (2013.01)
*H04L 12/703* (2013.01)

(52) U.S. Cl.
CPC .......... *H04L 45/22* (2013.01); *H04L 29/06027* (2013.01); *H04L 45/02* (2013.01); *H04L 45/28* (2013.01); *H04L 65/1006* (2013.01)
USPC .......................................... 370/216; 370/217

(58) Field of Classification Search
None
See application file for complete search history.

(56) References Cited

U.S. PATENT DOCUMENTS 6,546,498 B1 * 4/2003 Saegusa ......................... 714/4.2
6,650,644 B1 * 11/2003 Colley et al. ............. 370/395.21
6,678,264 B1 * 1/2004 Gibson ......................... 370/352

(Continued)

FOREIGN PATENT DOCUMENTS

WO    WO 2005/077014 A2    8/2005
WO        2008047037 A1    4/2008

OTHER PUBLICATIONS

"Digital Cellular Telecommunications System (Phase 2+); Universial Mobile Telecommunications System (UMTS); IP Multimedia Call Control Protocol Based on SIP and SDP; Stage 3" ETSI Standards, European Telecommunications Standards Institute, 124 229, V5.3.0, Dec. 2002.

(Continued)

*Primary Examiner* — Robert Wilson
(74) *Attorney, Agent, or Firm* — David D. Brush; Westman, Champlin & Koehler, P.A.

(57) ABSTRACT

Method of routing in a telecommunications network an SIP message intended to be routed through intermediate entities constituting nodes of a signaling path. According to the invention, said method comprises a step of bypassing an intermediate entity able to be bypassed if unavailable. Application to the IMS architecture.

7 Claims, 3 Drawing Sheets

(56) References Cited

U.S. PATENT DOCUMENTS

| | | | |
|---|---|---|---|
| 6,718,021 B2* | 4/2004 | Crockett et al. | 379/93.23 |
| 7,355,968 B2* | 4/2008 | Liu et al. | 370/225 |
| 7,376,755 B2* | 5/2008 | Pandya | 709/250 |
| 7,543,029 B2* | 6/2009 | Udono et al. | 709/206 |
| 2003/0167293 A1 | 9/2003 | Xhu et al. | 709/102 |
| 2003/0174648 A1 | 9/2003 | Wang et al. | |
| 2008/0201772 A1* | 8/2008 | Mondaeev et al. | 726/13 |
| 2010/0238928 A1* | 9/2010 | Prouvost et al. | 370/392 |

OTHER PUBLICATIONS

International Search Report and Written Opinion from counterpart foreign Application No. PCT/FR2007/052159 filed on Oct. 15, 2007.
English translation of the International Preliminary Report on Patentability and Written Opinion dated Jun. 10, 2009 for corresponding International Application No. PCT/FR2007/052159, filed Oct. 15, 2007.
International Search Report from counterpart foreign Application No. PCT/FR2007/052159 filed on Oct. 15, 2007.

* cited by examiner

METHOD OF ROUTING AN SIP MESSAGE IN THE EVENT OF UNAVAILABILITY OF INTERMEDIATE NODES

CROSS-REFERENCE TO RELATED APPLICATIONS

This Application is a Section 371 National Stage Application of International Application No. PCT/FR2007/052159, filed Oct. 15, 2007 and published as WO 2008/047037 on Apr. 24, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a method of routing an SIP message to be routed via intermediate entities constituting nodes of a signaling path.

The disclosure finds a particularly advantageous application in situations in which one or more intermediate entities through which the message must pass in transit are unavailable and therefore cannot be contacted by other entities on the same signaling path.

BACKGROUND OF THE DISCLOSURE

A telecommunications network is made up of various intermediate entities through which signaling messages conveyed between a sending entity and a destination entity pass in transit. A signaling message contains information linked to a call from the sending entity to the destination entity, such as a call set-up request, together with other information, such as a notification of the presence of messages in a messaging system, for example.

These intermediate entities can have very varied roles, from routing the signaling message to actions to be effected on that message, such as inserting or removing certain information with a view to providing a particular service.

The Session Initiation Protocol (SIP) is defined by the Internet Engineering Task Force (IETF), initially with the objective of enabling setting up, modification, and termination of multimedia sessions in an IP network. The SIP has also been adopted by various standardization bodies and consortia, such as the 3$^{rd}$ Generation Partnership Project (3GPP) and Telecoms & Internet converged Services & protocols for Advanced Networks (TISPAN), in the framework of their definition of network control architectures based on IP transport. Those architectures include the IP Multimedia Subsystem (IMS) architecture. The vocation of the SIP is therefore to establish itself as the session set-up protocol used in operated public networks, whether mobile or fixed.

Compared to other signaling protocols, the SIP is characterized by its capacity to convey routing information in the SIP messages themselves. This is because the first request, which initiates a session and is called the initial request, can contain the addresses of the entities through which it has to pass. This data is entered into the initial request message by the sending entity that is the source of the session, having been recovered by the sending entity at the time of its registration in the network or via other mechanisms. The signaling path corresponding to the session is set up when the initial request is submitted, as a function of the destination of the call, the architecture of the network, and the services necessary for the session. Subsequent SIP requests and responses contain all the data necessary for routing them. This is a major difference compared to other protocols, for which routing is essentially based on tables present in the network entities and on the entities involved in the call storing routing data linked to the call.

There are two types of SIP message: requests and responses thereto. Responses take the reverse path to the associated request.

A distinction is made between initial requests and subsequent requests. Subsequent requests are part of the same SIP dialogue created by an initial request sent by a sending entity. Only some initial requests can create an SIP dialogue, for example the INVITE message. The path of subsequent requests, i.e. the set of SIP entities of the network through which all requests that are part of this dialogue must pass, is determined at the time of submitting the initial request creating the dialogue.

An SIP initial request message includes a "Request-URI" header (where URI stands for Uniform Resource Identifier) that contains the address of the destination entity of the request. A SIP request can optionally include a particular "Route" header that contains, in decreasing order and in the form of URIs, a list of the identities of the entities to be passed through before reaching the destination; these are the intermediate entities through which the request must pass.

An intermediate SIP entity, typically an SIP proxy, receiving an initial request proceeds to analyze it. If the request contains a "Route" header, the entity then considers the first SIP entity present in this header to be the entity to which it must forward the request. If not, it determines the next entity to which the request must be forwarded from the "Request-URI" header, using specific routing mechanisms.

Any SIP entity, whether it is an intermediate entity or not, can add a "Route" header or the URI of additional entities to an existing "Route" header. This function has many uses. For example, it enables the first entity of the network contacted to add to the "Route" header the identifier of the entity responsible for managing services allocated to the user of the entity sending the request, in order to guarantee that the request passes through that entity. The entities responsible for managing services are known as application servers (AS).

The intermediate SIP entities through which the initial request passes that wish to remain in the signaling path insert their identifiers into a "Record-Route" header of the initial request before forwarding it to the next node.

The identifiers present in the "Record-Route" header at the time of submitting the initial request are repeated in the "Route" header of subsequent requests. These requests are routed in the following manner. An intermediate SIP entity receiving a subsequent SIP request proceeds to analyze it. If the request contains a "Route" header, then this entity considers the first SIP entity present in this header to be the entity to which it must forward the request. If not, it considers the entity present in the "Request-URI" header as the entity to which it must forward the request.

At the time of submitting an SIP request, each entity that is passed through adds its address to a "Via" header. Accordingly, this header accumulates in order the addresses of all the SIP entities passed through, including the address of the entity sending the request.

When an entity, which may be the destination entity of the request or an intermediate entity, generates a response to a request, it inserts therein a "Via" header containing the addresses received in the "Via" field of the request, in the same order. Each entity receiving this request, if it decides to forward it to the next node, sends it to the address that is first in the "Via" header of this response.

Generally speaking, it can happen that intermediate entities are not accessible at a given time, for example in the event of an equipment failure or overload. In such circumstances, the network can behave in two ways: either a message that should pass in transit through any such entity is rejected or an alternative path is found to enable the message to be conveyed to its destination anyway. This behavior can depend in particular on the characteristics of the entity concerned, namely whether it is indispensable or not, and on the signaling message type.

The SIP generally does not offer this alternative and allows only the first solution, i.e. rejection of the message.

Thus when an intermediate entity determines that the first SIP entity in the "Route" header of a request is not accessible, it can then send a failure response to the sending entity, even if it would have been preferable to convey the request to its destination avoiding this inaccessible intermediate entity, and even if it is unable to benefit from the processing operations that it could have effected.

Similarly, if an intermediate entity decides to send an SIP response to the next node and the SIP entity whose address is the first in the "Via" header of that response is not accessible, then it stops sending that response and can even cancel the transaction corresponding to that response, even if it would have been preferable to convey this response to the destination avoiding the inaccessible intermediate entity.

SUMMARY

Thus there is a need for a technique enabling rejection of a message to be avoided if an intermediate entity situated on a signaling path of the message is not available.

An aspect of the present disclosure relates to a method of routing in a telecommunications network an SIP message to be routed via intermediate entities constituting nodes of a signaling path, noteworthy in that said method includes a step of bypassing an intermediate entity that can be bypassed in the event of unavailability, said bypassing step being effected by eliminating the identifier of said intermediate entity to be bypassed in a header of an SIP message containing a list of the identifiers of the entities to be passed through.

An exemplary embodiment of the invention therefore has the advantage of enabling an SIP message to reach its destination even if it cannot pass in transit through an intermediate entity indicated in the "Route" or "Via" header. This function is very useful if the functions provided by the inaccessible entity are crucial to correct operation of the system and it is preferable for the request or response to reach its destination avoiding that entity, rather than being rejected.

The routing method of an embodiment of the invention advantageously includes a step of determining if an intermediate entity can be bypassed in the event of unavailability.

In a first embodiment, said determination step is executed by an entity using local data indicating if said intermediate entity can be bypassed.

In a second embodiment, said determination step is executed by an entity by consulting an external database indicating if said intermediate entity can be bypassed.

In a third embodiment, said determination step is effected by inserting into a routing header of said SIP message an indication of bypassing of said intermediate entity that can be bypassed.

It can be seen that an embodiment of the invention does not diverge significantly from the SIP. It requires the implementation of a specific function only by the intermediate entity executing the method of an embodiment of the invention, which entity can be surrounded by other SIP entities operating in the usual way.

In one embodiment of the invention relating to request messages, said header is the "Route" header of an SIP request message sent by a sending entity.

In a first variant of this embodiment, said indication of bypassing of said intermediate entity is communicated to the entity sending an initial request message during registration of said sending entity in the telecommunications network. The headers used are then the "Path" header of the REGISTER message and the "Service-Route" header of the 200 OK response message to the REGISTER message.

In a second variant of this embodiment, said indication of bypassing of said intermediate entity is communicated to the sending entity before sending an initial request message.

In a third variant of this embodiment, said bypass indication is inserted by said intermediate entity into the "Record-Route" header on submitting an initial request message and said "Record-Route" header is received by the entity sending said initial request message in a response message to said initial request and copied by said sending entity into the "Route" header of a subsequent request message.

In a fourth variant of this embodiment, said bypass indication is inserted by an intermediate entity other than said intermediate entity into the "Route" header on submitting an initial request message.

In another embodiment relating to response messages, said header is the "Via" header of an SIP request message.

In this embodiment, said bypass indication is inserted by said intermediate entity into the "Via" header of a request message. The "Via" header is then copied into the response messages by the entity sending the responses.

An embodiment of the invention also relates to an intermediate entity constituting a node of a signaling path for routing an SIP message in a telecommunications network, noteworthy in that said intermediate entity is able to insert a bypass indication into a routing header of said SIP message if said entity is unavailable.

An embodiment of the invention further relates to an entity constituting a node of a signaling path for routing an SIP message in a telecommunications network, noteworthy in that said entity includes means for bypassing an intermediate entity in the event of unavailability of said intermediate entity able to eliminate the identifier of said intermediate entity to be bypassed in a header of an SIP message containing a list of the identifiers of the entities to be passed through.

According to an embodiment of the invention, said entity includes means for determining if an intermediate entity can be bypassed in the event of unavailability.

An embodiment of the invention further relates to a computer program include program instructions for executing the method of the invention when said program is executed by a computer.

An embodiment of the invention finally relates to a signal transporting an SIP message including in a routing header an indication of bypassing of an intermediate entity in a signaling path that can be bypassed in the event of unavailability.

The following description with reference to the appended drawings, which are provided by way of non-limiting example, explains one or more embodiments of the invention and how it can be reduced to practice.

DETAILED DESCRIPTION OF ILLUSTRATIVE EMBODIMENTS

Figure 1:
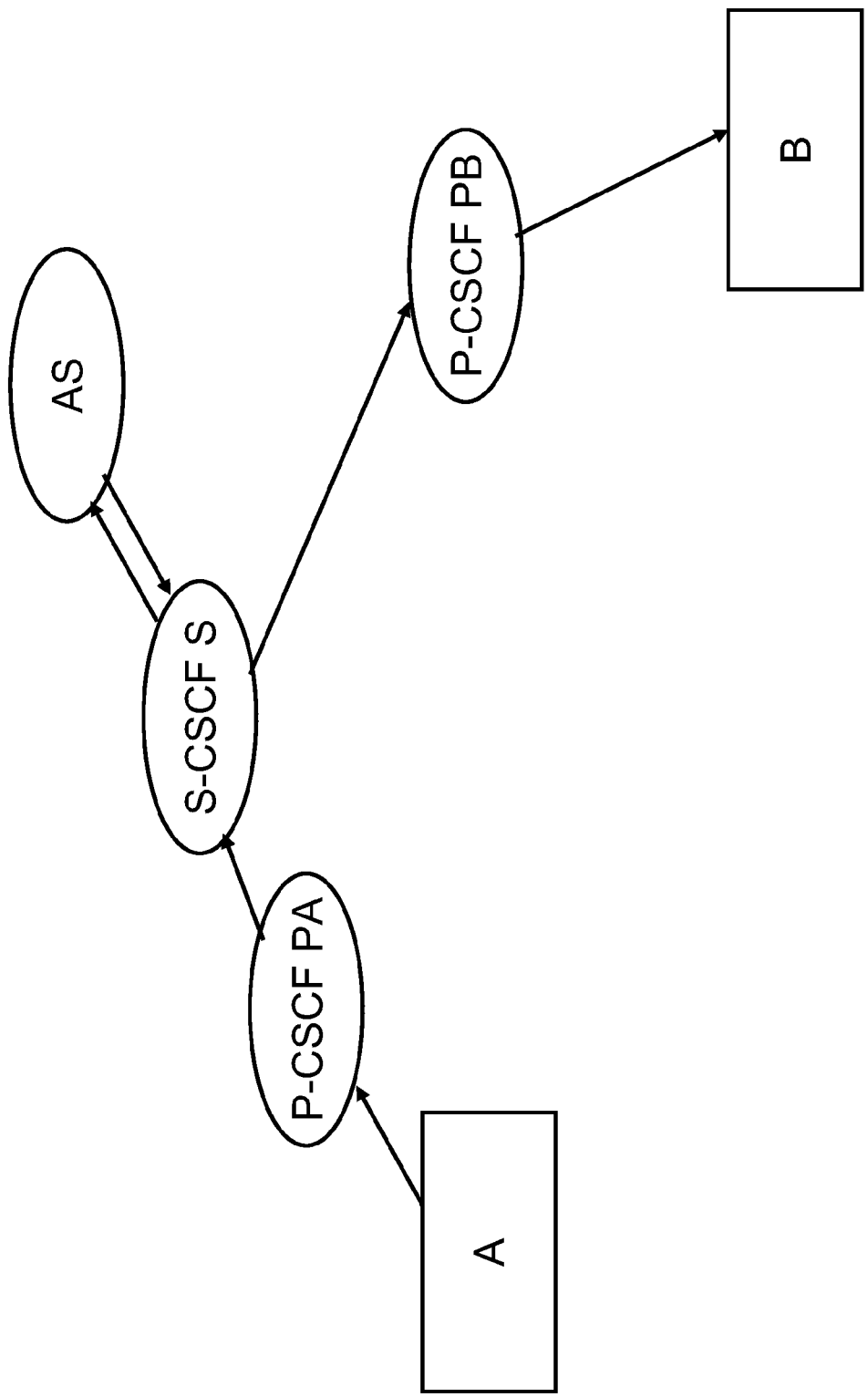
FIG. 1 is a diagram illustrating a method of routing an SIP request message in a IMS architecture network.

FIG. 1 represents a signaling path of an SIP request message sent in an IMS network by a sending entity A to a destination entity B. These entities A and B are fixed or mobile telephone terminals, for example, the terminal A initiating a telephone call to the terminal B.

At present the IMS architecture is essentially defined for telephone, videophone, presence, and instant messaging-type applications.

The FIG. 1 network includes various intermediate entities between the two terminals A and B, including:

P-CSCF (Proxy-Call Server Control Function) proxy servers PA and PB, which are the first points of contact of the terminals A and B in the IMS network, and which manage interaction with the resources of the transport network;

an S-CSCF (Serving-Call Server Control Function) server S that manages the terminal A in the IMS network and, in particular, the trigger points to application servers on which the user of the terminal A subscribes to one or more services; the S-CSCF server S is assigned to the terminal A when it is registered in the IMS network; and an application server (AS) associated with the service in question, for example the call transfer service; the application server AS contains all the information relating to the service subscribed to.

If an intermediate entity receives an initial or subsequent SIP request message containing a "Route" header or an SIP response message containing a "Via" header, it must forward that message to the next node on the signaling path indicated in the "Route" header or the "Via" header. However, if that node cannot be contacted because it is unavailable, the intermediate entity can decide to bypass it and to send the SIP message to the next node in the header concerned. If that node is also inaccessible, the intermediate entity can decide to bypass it as well.

Three mechanisms can be distinguished:

determining that an entity cannot be contacted;

if an entity cannot be contacted, determining if that entity should be bypassed or not;

bypassing an entity present in the "Route" header in the event of an SIP request or in the "Via" header in the event of an SIP response.

A SIP entity can determine that another entity cannot be contacted in two ways:

by means of an activity detection (keep alive) mechanism in the physical transport layer between the two entities; for example, terminals periodically send Hello messages to indicate their presence in the network; if a terminal is no longer sending such messages, it is considered to be unavailable;

sending a failure message via the physical transport layer at the time of the attempt to transmit the SIP request or response.

Having determined that another entity is unavailable, an intermediate entity must know if that other entity can be bypassed or not, as a function of whether the submission of the SIP message by the unavailable entity is indispensable or not. For example, the call transfer function is not indispensable to setting up and maintaining a telephone call between the terminals A and B. Also, if the application server AS responsible for this function becomes unavailable, it must be possible for SIP request and response messages to bypass it.

There are various ways for a first entity to determine if another entity that cannot be contacted should be bypassed or not.

In a first method, the first entity holds local data enabling it to tell if the entity that cannot be contacted can be bypassed or not in a given context. For example, terminal A contains data authorizing it to bypass the proxy server PA if it is unavailable.

In a second method, the first entity consults an external server or database to obtain the same information.

An embodiment of the invention further proposes another method whereby the information relating to whether an entity that cannot be contacted can be bypassed or not is associated with the identifier of that entity in the "Route" or "Via" header of the SIP message concerned. This information is contained in a new parameter of the URI of the unavailable entity, referred to below as the bypass indicator. The bypass parameter can take the following values, for example: yes or no. The absence of this parameter indicates that this extension of the URI is not applicable.

For SIP responses, this parameter can be added by the entity that cannot be contacted when inserting its URI into the "Via" header of the corresponding request.

For requests, the bypass indicator can be inserted in the URI of the entity that cannot be contacted in various ways:

During the phase of registering the sending entity in the network, the URI of the intermediate entity enriched with the bypass parameter is inserted into the "Path" header of the REGISTER message or the "Service-Route" header in the response message 200 OK to the REGISTER message.

The "Path" header is used during the phase of registering a terminal in order to register the path to the terminal in the form of a list of URIs. This information is then used by the S-CSCF proxy server that registered this terminal to indicate the signaling path for reaching that terminal in the "Route" header of the initial requests that are addressed to the terminal.

The "Service-Route" header is used to register the path for reaching the S-CSCF proxy server S managing the services of the user. That path is then inserted into the "Route" header of the initial request sent by the registered terminal in order that those requests be routed to the S-CSCF proxy server. The "Service-Route" header is inserted into the message 200 OK accepting registration in response to the REGISTER request sent by the proxy that registered the terminal.

The bypass indicator can be present in URIs constituting the "Route" header if said URIs are predetermined. These URIs are added by the SIP entity sending the initial request. For example, terminal A can be configured to insert into the "Route" header the URIs of predetermined entities that have been communicated to it before the initial request message was sent.

The URI of the intermediate entity, plus the bypass indicator, are inserted by said intermediate entity into the "Record-Route" header on submitting an initial request message. This "Record-Route" header is then received by the entity sending the initial request message in a response message to the initial request and copied by the sending entity into the "Route" header of a subsequent request message.

The bypass indicator is inserted into the "Route" header by an intermediate entity other than the intermediate entity concerned, on submitting an initial request message.

It should be noted that the bypass parameter can be enriched with other values for taking account of the context in which the message is received and the message type. For example:

messageType: the entity can be bypassed only if the message is of the type specified by this parameter;

earlyDialog: the entity can be bypassed only if the message concerned is received in an SIP early dialogue;

confirmedDialog: the entity can be bypassed only if the message concerned is received in an SIP confirmed dialogue.

The confirmed SIP dialogue and the early SIP dialogue are defined in the document RFC 3261.

If, on sending an SIP request message, an entity decides to bypass an intermediate entity whose URI is the first in the "Route" header, it must remove the URI of that intermediate entity from the "Route" header. It then applies to the request modified in this way the standard SIP routing procedures. This operation can be repeated if the next node in the signaling path defined by the "Route" header is also inaccessible. Thus a number of nodes can be bypassed at the same time.

Likewise if, on sending an SIP response message, an entity decides to bypass an intermediate entity whose URI is the first in the "Via" header, it must remove the URI of that intermediate entity from the "Via" header. It then applies to the response modified in this way the standard SIP routing procedures. This operation can be repeated if the next node in the signaling path defined by the "Via" header is also inaccessible. Thus a number of nodes can be bypassed at the same time.

Figure 2:
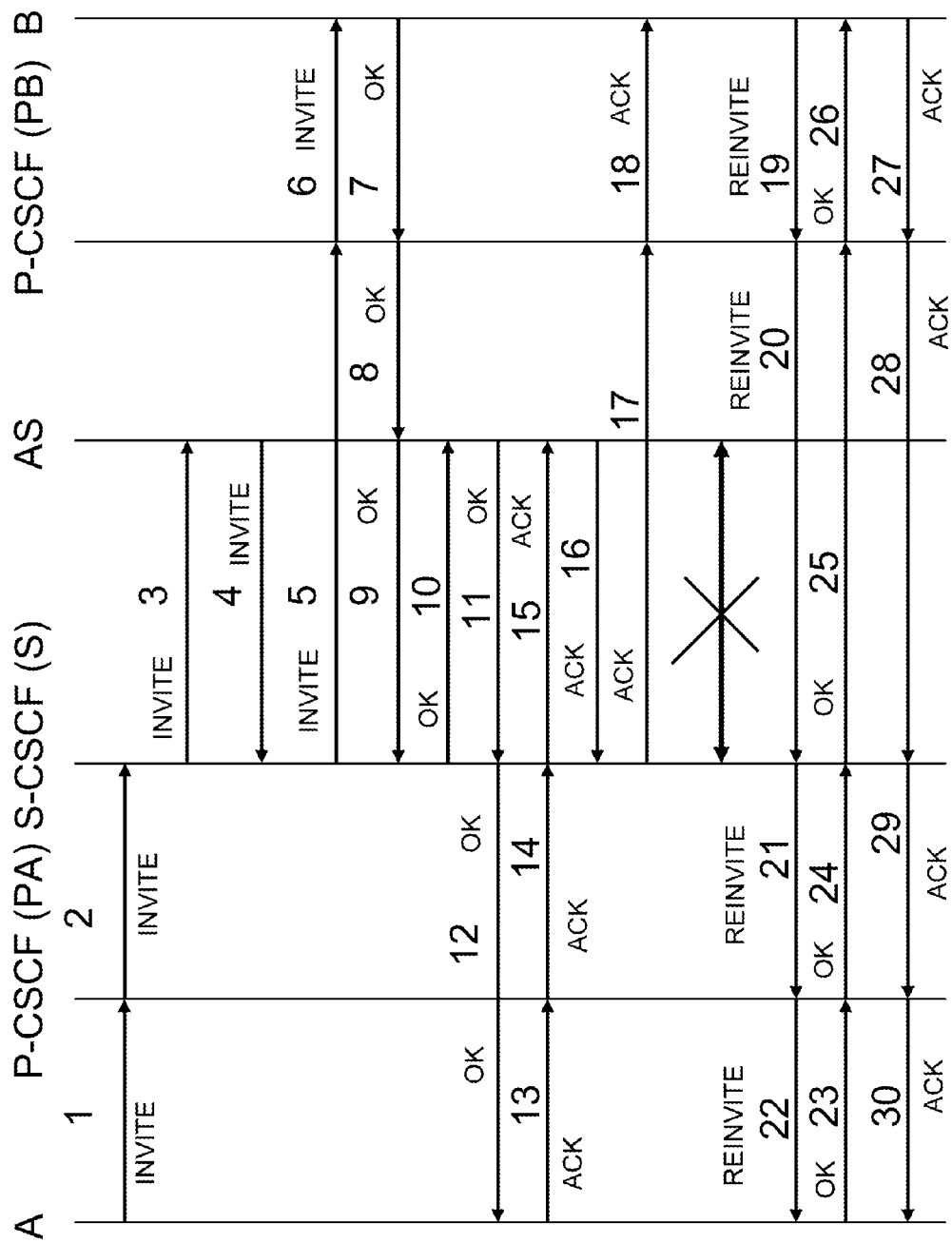
FIG. 2 is a diagram of the method of an embodiment of the invention of routing signaling messages between diverse entities constituting nodes of the FIG. 1 IMS network.

An example of the invention implementing the call transfer service in an IMS architecture is described below with reference to FIG. 2. Call transfer can be invoked at any time in the call by the user subscribing to this service (the sending entity).

The invocation mechanism for application servers AS as at present defined by the 3GPP allows invocation of an AS only on the first request initiating the session or the call. Accordingly, given that the call transfer application server AS must be able to intervene in the call at any time, it must be invoked and inserted into the SIP signaling path for any call involving a subscriber to the transfer service at the start of the call. To enable calls passing through this server to continue to be transmitted normally if it is no longer available, the server adds the parameter "bypass=yes" to its URI before inserting it into the "Record-Route" header of the initial request. Thus if this application server AS fails during call set-up or when the call has been set-up the S-CSCF will bypass it.

1. A sends the INVITE request message to the P-CSCF proxy server of A, denoted PA, to which it is attached, to initiate a call to B. This message contains in the "Route" header the URI of the S-CSCF server S responsible for executing the services of A and the URI of the proxy PA. The entity PA is the intermediate entity that is part of the signaling path between the terminal A and the S-CSCF server S.
2. The P-CSCF proxy server PA removes its URI from the "Route" header and then sends the request to the S-CSCF server S whose URI is now the first one in this header, after adding the "Record-Route" header containing its URI so that it can receive subsequent requests.
3. The S-CSCF server S determines that A subscribes to the call transfer service and decides to invoke the entity AS responsible for providing this service. The S-CSCF server S adds the URI of the transfer AS followed by its own URI to the "Route" header of the invite request before forwarding it to the transfer AS in order for the request to return to S after passing through the transfer AS.
4. The transfer AS adds its URI to the "Record-Route" header in order to remain in the signaling path of that call and to be able to provide the transfer service should A invoke it, and sends the INVITE request back to the S-CSCF server S whose URI is the next one in the "Route" header. The URI of the "transfer" AS contains the parameter "bypass=yes" in order to indicate that this AS can be bypassed if it becomes non-contactable.
5. The S-CSCF S server adds its URI in the "Record-Route" header before sending the INVITE request message to the P-CSCF proxy server of B, denoted PB, to which B is attached.
6. The P-CSCF proxy server PB adds its URI to the "Record-Route" header before sending the INVITE request to B.
7, 8, 9, 10, 11, and 12. B accepts the call from A, sending a response message 200 OK. This response is routed to A along the reverse path taken by the INVITE request stacked in the "Via" header on submitting the INVITE request. This response contains the "Record-Route" header that B received in the INVITE message in order to indicate to A the intermediate entities of the call.
13, 14, 15, 16, 17, 18. A acknowledges the 200 OK response, sending the request ACK. This request takes the path stacked in the "Record-Route" header on submitting the initial INVITE request. A inserts the "Route" header into the ACK request containing the URIs received in the "Record-Route" header of the SIP 200 OK response to the INVITE request. The 200 OK response can be preceded by other provisional responses, in particular a ringing response 180 indicating that B has been alerted. For simplicity, these responses and the "Route" header of the ACK request and the "Via" header of the 200 OK response are not represented in this diagram.
19. B sends a re-INVITE request message to A. This request can be sent to negotiate the parameters of the media session, such as changes of codec, for example, or to refresh the session that has been set up, for example.
20. The P-CSCF proxy server PB routes the re-INVITE request to the S-CSCF server S on the basis of the "Route" header.
21. The S-CSCF S determines that the transfer AS can no longer be contacted and decides to bypass it because the URI of this AS received in the "Route" header contains the "bypass=yes" parameter. To this end, it eliminates the URI of the transfer AS and its URI from the "Route" header and then re-applies the routing procedures to the re-INVITE request as modified in this way: it sends the re-INVITE request to the P-CSCF proxy server PA whose URI is the first in the "Route" header.
22. The P-CSCF proxy server PA forwards the re-INVITE request to A.
23, 24, 25, and 26. A accepts the re-INVITE request, sending the response 200 OK. This response takes the reverse path to that taken by the re-INVITE request.
27, 28, 29, 30. B acknowledges this 200 OK response with the request ACK. This request is routed in the same way as the re-INVITE request: the transfer AS is bypassed.

Figure 3:
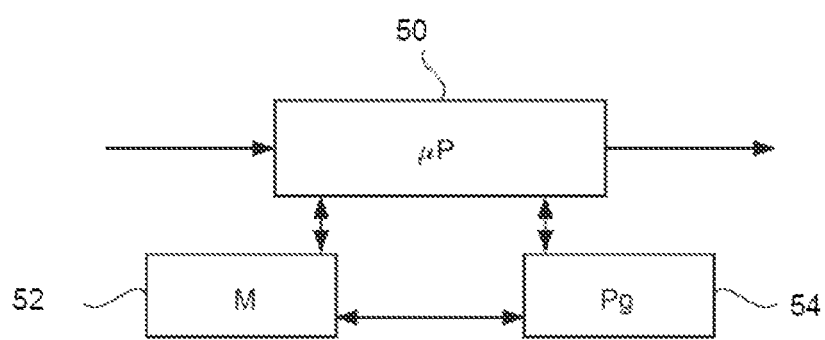
FIG. 3 is a diagram illustrating a simplified structure of a server constituting an intermediate entity according to an embodiment of the disclosure.

FIG. 3 is a diagram illustrating a simplified structure of a server constituting an intermediate entity according to an embodiment of the disclosure. Such a server includes a processor 50, a computer-readable memory 52, and a computer program 54 stored thereon and including instructions for performing the steps of the methods described herein when executed by the processor 50.

The invention claimed is:

1. A method comprising:
  a receiving a Session Initiation Protocol (SIP) message which is being routed through a plurality of intermediate entities constituting nodes of a signaling path in a telecommunications network;
  inserting a bypass indicator into a routing header of the SIP message, wherein the bypass indicator indicates whether an intermediate entity of the plurality of intermediate entities in the signaling path can be bypassed in an event that the intermediate entity becomes unavailable to route the SIP message; and
  receiving a SIP message by another intermediate entity in the signaling path and, if said intermediate entity is unavailable to route the received SIP message and the received SIP message contains a routing header with a bypass indicator that indicates said intermediate entity can be bypassed,
  eliminating an identifier of said unavailable intermediate entity in the routing header of the received SIP message, wherein the routing header of the received SIP message contains a list of identifiers of the intermediate entities along the signaling path through which the received SIP message will pass.

2. The method according to claim 1, wherein said bypass indicator is communicated to a sending entity in the signaling path during registration of said sending entity in the telecommunications network.

3. The method according to claim 2, wherein said SIP message comprises an initial request SIP message and said bypass indicator is communicated to the sending entity before the sending entity sends the initial request SIP message along the signaling path.

4. An intermediate entity, configured to route a Session Initiation Protocol (SIP) message in a signaling path of a telecommunications network, comprising:
  a processor configured to insert a bypass indicator into a routing header of said SIP message that indicates whether the intermediate entity can be bypassed if said intermediate entity becomes unavailable for routing further SIP messages along the signaling path.

5. An entity configured to route a Session Initiation Protocol (SIP) message in a signaling path of a telecommunications network, wherein the SIP message comprises a routing header containing a list of identifiers of intermediate entities through which the SIP message is to be routed along the signaling path, wherein the entity comprises:
  a processor configured to determine if at least one of the intermediate entities in the signaling path can be bypassed in an event said at least one intermediate entity unavailable to route the SIP message, on the basis of a bypass indicator inserted previously by said at least one intermediate entity in said routing header, and configured to bypass said at least one intermediate entity when the processor determines that said at least one intermediate entity can be bypassed, wherein the processor eliminates the identifier of said at least one intermediate entity to be bypassed in said routing header of the SIP message.

6. A non-transitory computer-readable medium storing computer program instructions, which when executed by a computer perform the following:
  receiving a Session Initiation Protocol (SIP) message which is being routed through a plurality of intermediate entities constituting nodes of a signaling path in a telecommunications network, said SIP message including a bypass indicator that indicates whether an intermediate entity of the plurality of intermediate entities in the signaling path can be bypassed in an event that the intermediate entity is unavailable to route the SIP message, and
  in the event said intermediate entity is unavailable to route the SIP message and the bypass indicator indicates said intermediate entity can be bypassed, eliminating an identifier of said unavailable intermediate entity in the routing header of the SIP message, which contains a list of identifiers of the intermediate entities along the signaling path through which the SIP message will pass.

7. A method comprising:
  generating a signal transporting a Session Initiation Protocol (SIP) message, which includes, within a routing header of the SIP message, a bypass indicator, inserted by an intermediate entity along a signaling path, that indicates whether the intermediate entity can be bypassed in the event that the intermediate entity unavailable for routing the SIP message; and
  transmitting the signal from a sending entity toward a destination entity along the signaling path.

* * * * *